MULTIPLEX COMMUNICATION SYSTEMS EMPLOYING ORTHOGONAL HERMITE WAVEFORMS

Filed Sept. 17, 1964 4 Sheets-Sheet 1

INVENTORS
PETER K. HIGUCHI
SHERMAN KARP
BY
Leon D. Rosen
ATTORNEY

May 21, 1968 P. K. HIGUCHI ETAL 3,384,715

MULTIPLEX COMMUNICATION SYSTEMS EMPLOYING ORTHOGONAL HERMITE WAVEFORMS

Filed Sept. 17, 1964 4 Sheets-Sheet 2

INVENTORS
PETER K. HIGUCHI
SHERMAN KARP

BY Leon D. Rosen

ATTORNEY

INVENTORS
PETER K. HIGUCHI
SHERMAN KARP
BY
Leon D. Rosen
ATTORNEY

INVENTORS
PETER K. HIGUCHI
SHERMAN KARP
BY
Leon D. Rosen
ATTORNEY

3,384,715
MULTIPLEX COMMUNICATION SYSTEMS EMPLOYING ORTHOGONAL HERMITE WAVEFORMS

Peter K. Higuchi and Sherman Karp, Los Angeles, Calif., assignors, by mesne assignments, to McDonnell Douglas Corporation, Santa Monica, Calif., a corporation of Maryland Filed Sept. 17, 1964, Ser. No. 397,145
7 Claims. (Cl. 179—15)

ABSTRACT OF THE DISCLOSURE

Multiplex communication system including transmitter and receiver employing orthogonal Hermite polynominal waveforms. Transmitter includes means generating Hermite waveforms which are multiplied by respective information signals and summed to modulate a carrier that is transmitted. Receiver includes means generating similar Hermite waveforms which are multiplied by the summed signal demodulated from the received carrier to provide respective output signals each having an average value proportional to a corresponding one of the information signals. The transmitter Hermite waveforms and information signals, and receiver Hermite waveforms and output signals having durations restricted to selected, periodic time periods which limit crosstalk to predetermined percentages.

This invention relates to communication systems and more particularly to multiplex communication systems which employ orthogonal waveforms.

It is often desirable to transmit several channels of information simultaneously. One method of accomplishing this is by the use of a series of mutually orthogonal waveforms, e.g., sine *wt*, since 2*wt*, sine 4*wt*, etc., one waveform being provided for each channel of information. Samples are taken of the information signals of each channel and each orthogonal waveform is multiplied by the signal samples in one channel. As a result, the amplitude of each orthogonal waveform is proportional to the signal in each channel. The resulting series of waveforms are summed together and transmitted. At the receiver, each channel is separated out by multiplying the mixture of waveforms by one of the waveforms in the orthogonal series, e.g., sine 2*wt*. The average value of the product is proportional to the amplitude of that component waveform, sine 2*wt*. which is identical to the multiplying waveform employed at the receiver. Since the amplitude of the component orthogonal waveform sine 2*wt* is proportional to the information signals by which it was multiplied at the transmitter, the average value of the product is proportional to the information signal samples. Thus, by separately multiplying the received signal by each of the orthogonal waveforms in the series, each of the original information signal samples is obtained.

When an actual multiplex communication system using orthogonal waveforms is operated, it is found that the received information signals of each channel include interference from the other channels, this interference generally referred to as crosstalk. Crosstalk is due to the fact that a series of waveforms is generally not truly orthogonal if each waveform consists of repetitious sections, each of which existing for only a limited period of time. Crosstalk is reduced by changing the amplitude of the orthogonal waveform at greater intervals which requires that information signal samples be taken less frequently, or by allowing higher frequencies. However, the former results in a greater time being required for the transmission of the same number of bits of information and the latter results in a larger transmission bandwidth. All communication systems are time-limited and band-limited, i.e., a certain amount of information must be transmitted in a limited period of time and the transmission bandwidth is limited and therefore crosstalk occurs.

Most orthogonal multiplex communication systems proposed heretofore have employed orthogonal sine or Legendre polynomial waveworms. The systems of this invention employ waveforms based on the Gaussian function, which enables multiplex communication with far less crosstalk, or mutual channel interference, than has been possible heretofore, for given time and band limiting requirements.

Accordingly, one object of the present invention is to provide a communication system of greater efficiency than has been available heretofore.

Another object is to provide a time limited and band width limited orthogonal multiplex communication system wherein there is a minimum of interference between information channels.

Another object is to provide a communication system utilizing waveforms which enable the transmission of information signals with a maximum efficiency, for given band limiting and time limiting requirements.

The foregoing and other objects are attained by utilizing orthogonal waveforms based on the Gaussian function (the probability function of statistics which, when plotted has a bell-shaped curve). The waveforms utilized in this invention, which are orthonormal to the Gaussian function and to each other, are obtained by multiplying the Gaussian function by Hermite polynomial functions. The orthogonal functions thus based on the Gaussian function are herein called Hermite waveforms. The Hermite waveforms theoretically have no beginning or ending wherein they are zero, and in a practical system truncated Hermite waveforms are used. However, the Hermite waveforms are "compact," i.e., most of their energy is concentrated in a small period of the wave centered about its axis of symmetry. Accordingly, even with moderate truncation, the resulting signal distortions have negligible effects of the orthogonal properties and very little crosstalk results. Consequently, an orthogonal multiplex system utilizing truncated Hermite waveform signals requires only a relatively narrow bandwidth to accurately communicate considerable information in a short period of time.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
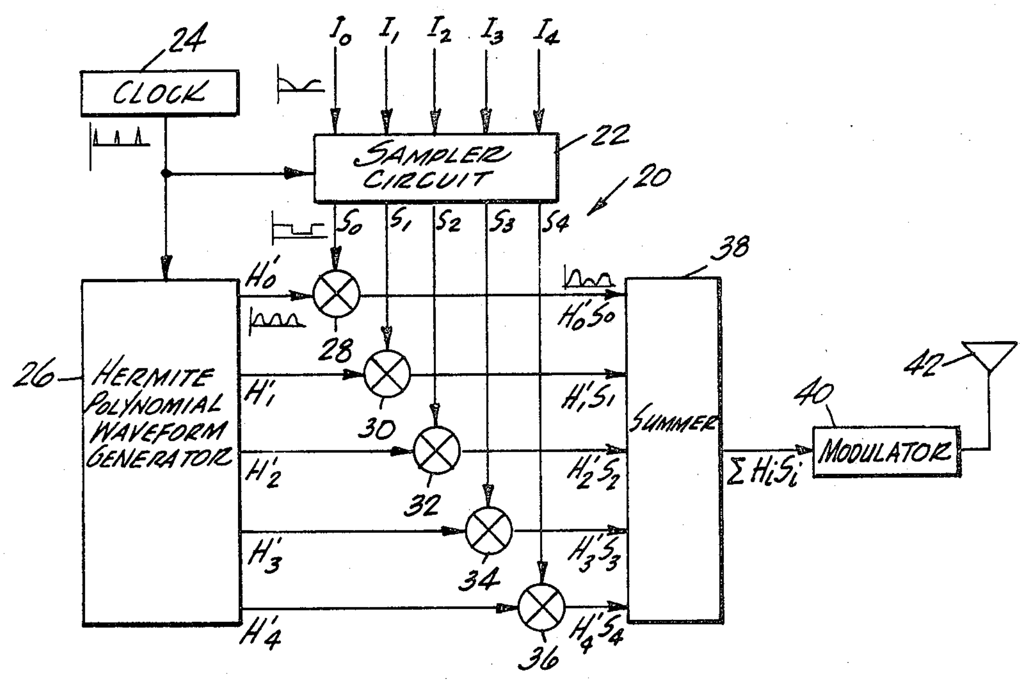
FIGURE 1 is a block diagram of a simplified transmitter constructed in accordance with the invention.

Reference is now made to FIG. 1 which is a block diagram of a simplified transmitter 20 constructed in accordance with the invention. The transmitter 20 comprises five information channels $I_0$, $I_1$, $I_2$, $I_3$ and $I_4$ which carry information signals to be transmitted. Each of the signals is sampled at regular intervals by a sampler circuit 22, the rate of sampling being controlled by signals from a clock 24. The samples S, which are individually identified as $S_0$, $S_1$, $S_2$, $S_3$, and $S_4$, are all taken at the same time.

A waveform generator 26 generates five signals $H_0'$, $H_1'$, $H_2'$, $H_3'$, and $H_4'$ which are composed of sections of five mutually orthogonal Hermite waveforms $H_0$, $H_1$, $H_2$, $H_3$, and $H_4$ shown in FIGS. 3 through 7. The instant of time at which the generation of the Hermite waveform sections is begun and ended is controlled by signals from the clock 24, so that the sections are synchronized with the sampler circuit 22. The signal samples S and Hermite waveform sections H are multiplied together in mixer circuits 28, 30, 32, 34 and 36. Due to synchronism by the clock 24, a constant signal sample S remains during the same period as one Hermite waveform section H with which it is multiplied in a mixer circuit. The output of the mixer circuits 28, 30, 32, 34, and 36 are therefore trains of Hermite waveforms identified as sections $H_0'S_0$, $H_1'S_1$, $H_2'S_2$, $H_3'S_3$ and $H_4'S_4$, each section having an amplitude proportional to the signal sample with which it is multiplied.

The output of the mixer circuits 28, 30, 32, 34 and 36 are delivered to a summer circuit 38 which adds or sums the signals together to yield a sum signal $\Sigma H_iS_i$. This signal modulates a carrier wave in modulator 40 and the modulated signal is transmitted by transmitting antenna 42.

Figure 2:
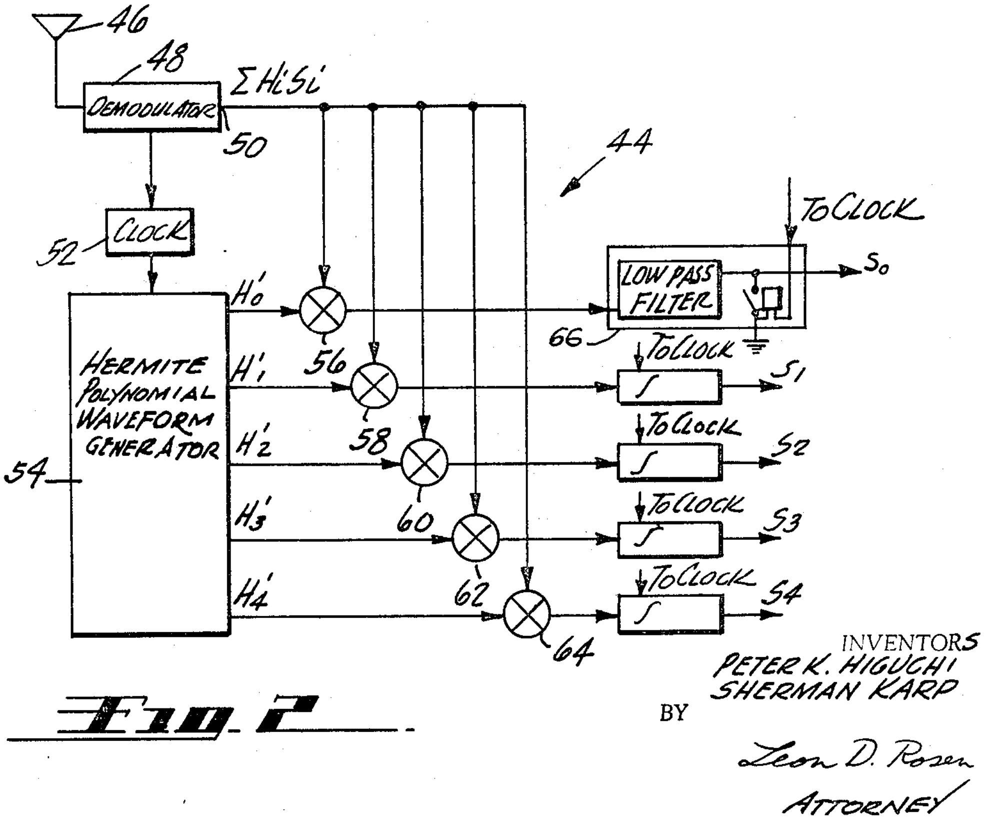
FIG. 2 is a simplified block diagram of a receiver for receiving signals transmitted by the transmitter of FIGURE 1.
Figure 3:
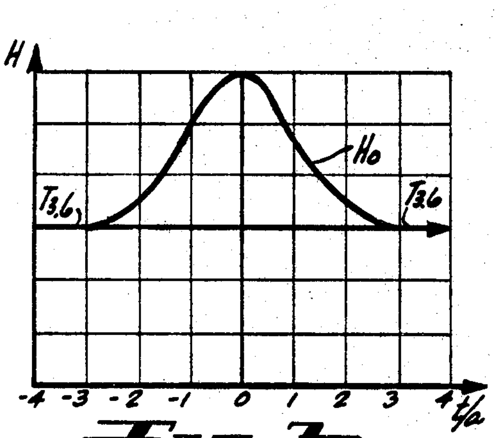
FIG. 3 is a graph showing the form of a Hermite waveform, $H_0$, of the first order, which is the Gaussian function, the amplitude H of the waveform being plotted as a function of an independent variable $t/a$, where $t$ represents truncation time and $a$ represents a rationalizing constant.
Figure 4:
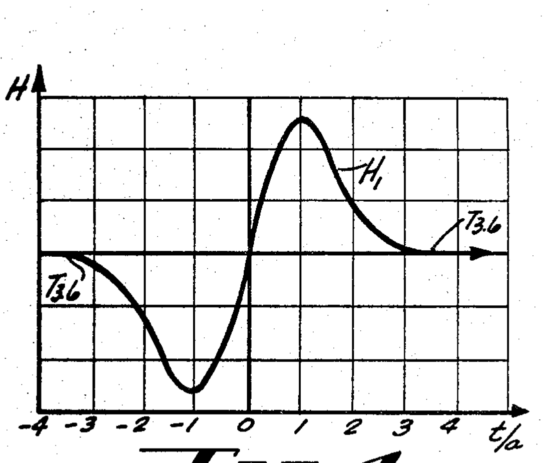
FIG. 4 is a plot of a Hermite waveform, $H_1$, of the second order which is orthogonal to the waveform of FIG. 3.
Figures 5, 6:
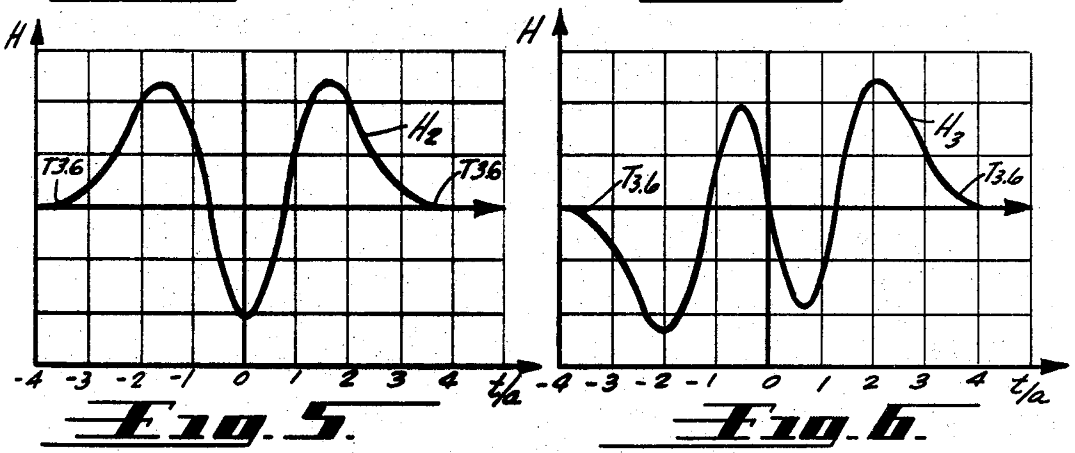
FIG. 5 is a Hermite waveform, $H_2$, of the third order which is orthogonal to the waveforms of FIGS. 3 and 4.
FIG. 6 is a plot of a Hermite waveform, $H_3$, of the fourth order, which is orthogonal to the waveforms of FIGS. 3, 4 and 5.

The transmitted signal is received and processed in the receiver 44 of FIG. 2. A receiving antenna 46 receives the signal and delivers it to a demodulator 48 to obtain the sum signal $\Sigma H_iS_i$ at output 50. A clock 52, synchronized with the received signal, controls the instant of time at which a waveform generator 54 begins and ceases to generate a signal. The waveform generator 54, which is identical to the generator 26 of the transmitter, generates the same five Hermite waveform sections $H_0'$, $H_1'$, $H_2'$, $H_3'$ and $H_4'$. Each of the trains of the Hermite waveform sections are multiplied by the demodulated sum signal $\Sigma H_iS_i$ in mixers 56, 58, 60, 62 and 64.

The multiplication of the sum signal $\Sigma H_iS_i$ by $H_0'$ in mixer 56 yields a complex alternating signal whose average value is proportional to the amplitude of the component $H_0'S_0$ of the sum signal $\Sigma H_iS_i$.

The output of mixer 56 is delivered to an integrator circuit 66. Integrator circuit 66 comprises a low pass filter whose output is discharged at the end of each period of duration of a Hermite waveform section. During the period of a Hermite waveform signal section, the output of the filter 66 slowly rises to the value of the information signal sample to be communicated. Therefore, the output of the filter is generally sampled at the end of each period of a Hermite waveform section to obtain an information signal. After the signal is obtained, a signal from the clock 52 discharges the output of the filter so that the signal from the next Hermite waveform section will not be affected. During the period of a Hermite waveform section, the output of the integrator gradually builds up to the signal sample $S_0$. The contributions of the other channels total zero over the complete period of a signal section. The output of the integrator 66 is proportional to the average value of $H_0'S_0$. Since the amplitude of $H_0'$ is the same for each Hermite waveform section in the train of sections, the output of the integrator 66 is proportional to $S_0$. Thus, the original sample $S_0$ is detected by the receiver.

The output of the other four mixers 58, 60, 62 and 64 have an average value proportional to $S_1$, $S_2$, $S_3$, and $S_4$, respectively. Thus the outputs of filters 68, 70, 72 and 74 through which the multiplied signals pass are the original signal samples $S_1$, $S_2$, $S_3$, and $S_4$.

The Hermite waveforms may be derived from the Gaussian function. An orthonormalized set of such functions is defined by the equation:

$$H_n(t)=\frac{(-1)^n a^{(n-1/2)}}{\pi^{1/4}\sqrt{n!}\,2^{n/2}}\, e^{t^2/2a^2}\frac{d^n}{dt^n}[e^{-t^2/a^2}] \quad \text{(Eq. 1)}$$

where:

$n$ is any non-negative integer;

$t$ represents time, which may be positive or negative, and which is the independent variable of the equation;

$H_n(t)$ is the amplitude of the function at any given time $t$;

$a$ is a rate number representing the rate of change or "frequency" of the function; and $d^n/dt^n$ represents the derivative of the bracketed quantity, of the $n$ order.

Generally, a set of orthonormal functions constructed in accordance with Equation 1 is defined by utilizing the integers 0, 1, 2, 3, etc. and other adjacent integers for each number $n$, one integer being used for each function of the set. The same rate number $a$ is generally used for all functions in an orthonormalized set.

The five functions which use integers $n$ of values 0, 1, 2, 3 and 4 are identified as the functions $H_0$, $H_1$, $H_2$, $H_3$ and $H_4$ and are given by the following equation as functions of time $t$, all of the following equations being derived from Equation 1:

$$H_0(t)=\frac{1}{\pi^{1/4}a^{1/2}}e^{-t^2/2a^2} \quad \text{(Eq. 2)}$$

$$H_1(t)=\frac{2^{1/2}t}{\pi^{1/4}a^{3/2}}e^{-t^2/2a^2} \quad \text{(Eq. 3)}$$

$$H_2(t)=\frac{1}{\pi^{1/4}2^{1/2}a^{5/2}}(2t^2-a^2)\,e^{-t^2/2a^2} \quad \text{(Eq. 4)}$$

$$H_3(t)=\frac{2^{1/2}}{\pi^{1/4}6^{1/2}a^{7/2}}(2t^3-3a^2t)\,e^{-t^2/2a^2} \quad \text{(Eq. 5)}$$

$$H_4(t)=\frac{1}{2\pi^{1/4}6^{1/2}a^{9/2}}(4t^4-12a^2t^2+3a^4)\,e^{-t^2/2a^2} \quad \text{(Eq. 6)}$$

The foregoing functions are plotted in FIGS. 3, 4, 5, 6, and 7 as functions of $t/a$. Sections of these functions are used in the communication system of FIGS. 1 and 2 wherein they are identified as $H_0'$, $H_1'$, $H_2'$, $H_3'$ and $H_4'$.

If the entire Hermite waveform functions from the times $-\infty$ to $+\infty$ were employed to transmit each information signal sample, or bit, the set of functions would be perfectly orthonormal. As a result, there would be no interference between the channels, i.e., no crosstalk. In practical systems the time and band limiting requirements limit the length of the Hermite waveform sections that can be used. The amount of crosstalk is directly related to the length of the sections. However, even relatively short sections of Hermite waveforms have very little crosstalk and can be used in practical systems. It is largely this property of Hermite waveforms, namely the small crosstalk obtained with relatively short sections of the waveforms which is due to the concentration of energy in a small period of the waveform, that makes them especially desirable for use in multiplex communication systems.

The crosstalk between any two channels is a function of the truncation of the Hermite waveforms carrying the channels. For symmetrical truncations, the crosstalk energy, C, is given by:

$$C=\int_{-T}^{T} H_n(t)H_m(t)dt \qquad \text{(Eq. 7)}$$

where:

$H_n(t)$ is a first Hermite waveform given as a function of time as specified in Equation 1;

$H_m(t)$ is a second Hermite waveform in the same orthonormal set; and

T is the period of time between the axis of symmetry of the waveform and its truncation points.

Inasmuch as the integration period is taken over two symmetrical intervals (−T to 0 and 0 to +T) C is always zero where one function is even and the other odd, as for the functions $H_0$ and $H_1$ or $H_1$ and $H_2$, etc.

Figures 7, 8:
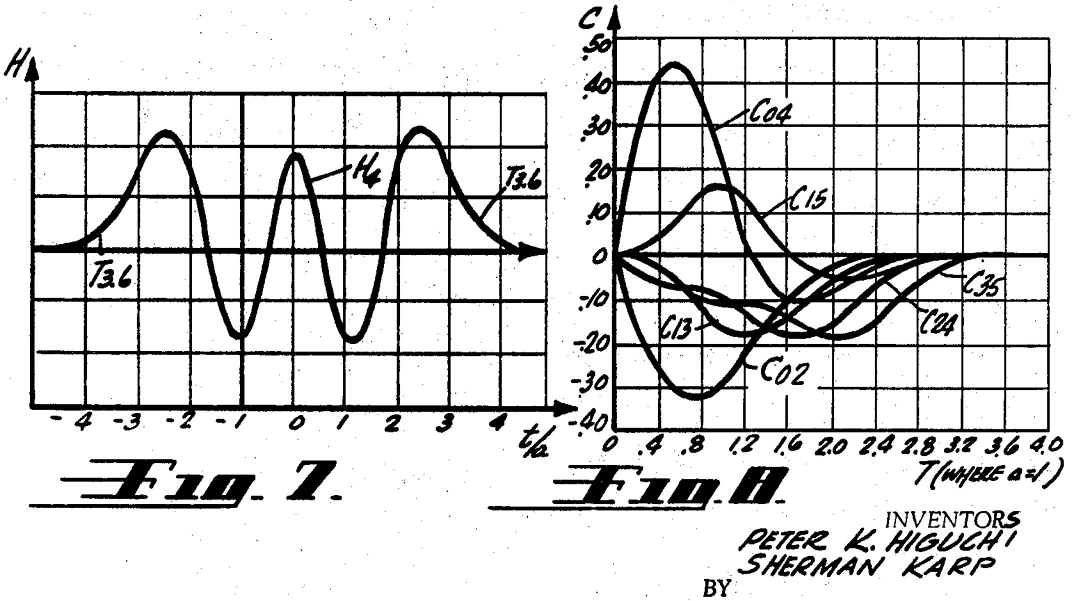
FIG. 7 is a plot of a Hermite waveform, $H_4$, of the fifth order which is orthogonal to the waveforms of FIGS. 3, 4, 5 and 6.
FIG. 8 is a plot of the crosstalk energy of sets of two Hermite waveforms each.

The crosstalk energy, C, between any two Hermite waveform sections of a set of the first six waveforms $H_0$, $H_1$, $H_2$, $H_3$, $H_4$ and $H_5$ defined by Equation 1, is given in FIG. 8 as a function of truncation time T, where the variable $a$ of Equation 1 is equal to one. The units of the dependent variable C represent the fraction of total waveform energy of one waveform appearing in another waveform as crosstalk. The subscript for each graph in FIG. 8 specifies the two Hermite waveforms whose mutual crosstalk is plotted, for example, $C_{04}$ represents the crosstalk energy between sections of the waveforms $H_0$ and $H_4$. A negative energy indicates that the crosstalk noise is negative, and it therefore adds a noise signal of negative algebraic sign to the information signal. It can be seen from FIG. 8 that very little crosstalk is induced in a six channel multiplex system using Hermite waveform sections by truncating the waveforms at $T=3.6$ and such truncation points are indicated on the waveforms of FIGS. 3, 4, 5, 6 and 7 as $T_{3.6}$.

The truncation of the Hermite waveform signals can be made at any point. However, if the time period of each wave is very short, the amount of crosstalk is very large and many errors are likely to arise. If the time period of each wave is very long, less information is transmitted in each period of time. Generally, the period of the waveforms should be chosen so that the largest crosstalk between any two Hermite waveform signal sections is less than a few percent. Where the communication system contains very little external noise, as where there is a high quality transmission line between transmitter and receiver, and where very little noise can be tolerated, the maximum crosstalk may be limited to one-thousandth of a percent or less. For a system of six channels, a maximum of several percent crosstalk occurs at $T/a$ equal to about 3.2, as can be seen from FIG. 8 (where $a=1$). The crosstalk is only about one-thousandth percent at a $T/a$ of 5. For a limited number of additional channels, the $T/a$ required for a maximum crosstalk of one-thousandth percent increases by about 0.2 per channel. Inasmuch as practical multiplex communications systems generally utilize at least six channels, the required $T/a$ is generally given by $3.2<T/a<5+0.2$-per-channel-over-six.

The generation of the Hermite waveforms may be accomplished in any one of the many ways by which arbitrary functions are constructed. One way is by the addition of several sinusoidal waveforms, of frequencies which are multiples of the basic repetition rate of the trains of Hermite waveform sections, according to the principles of Fourier analysis. Another way is by the use of matched filters, wherein a pulse input generates a Hermite waveform output.

Another method of generating the Hermite waveforms is by the use of a pulse generator connected to shift registers and resistive networks, as illustrated in the circuit

Figure 10:
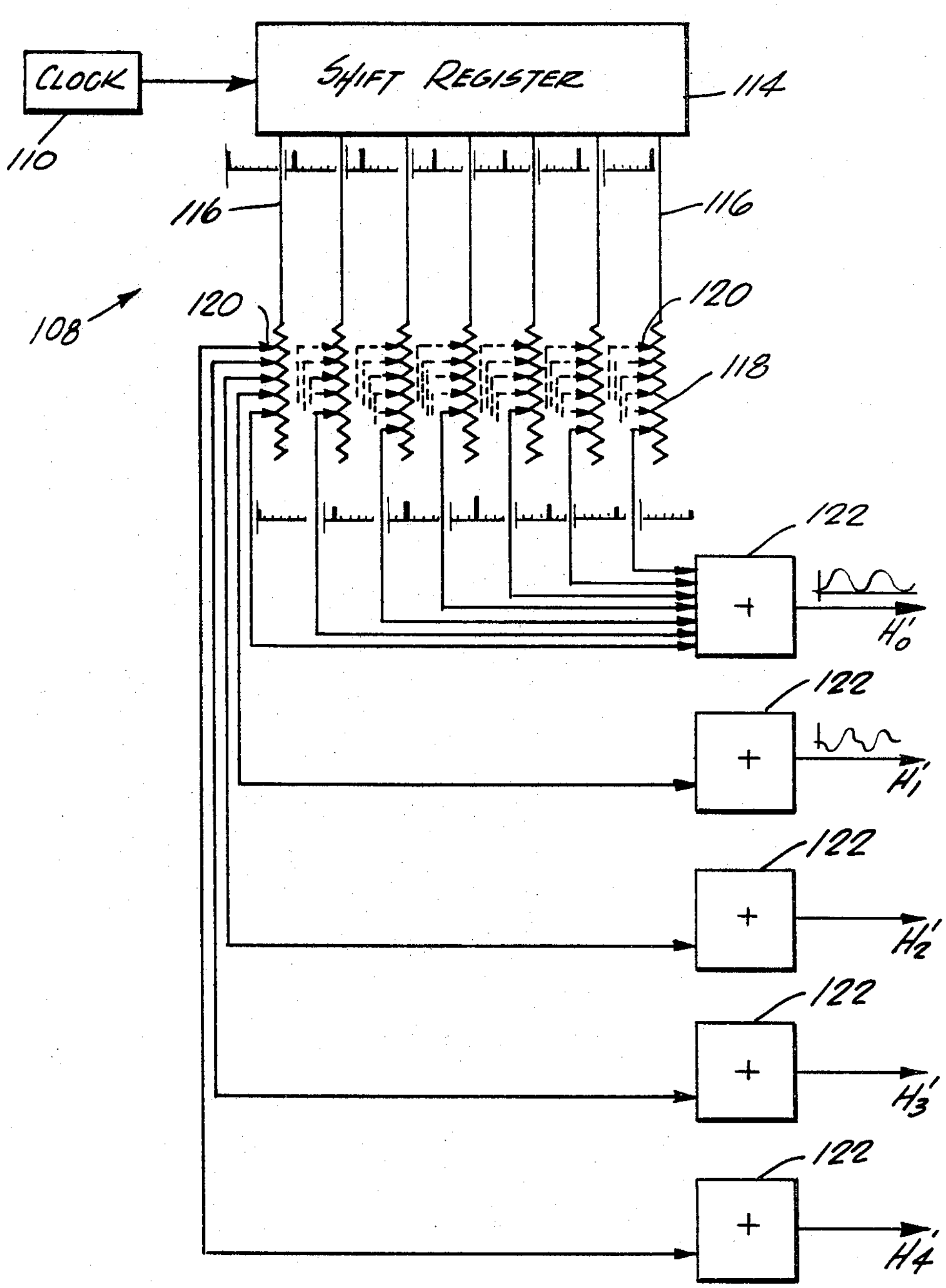
FIG. 10 is a block diagram of a Hermite waveform generator which is useful in the transmitter of FIG. 1 or the receiver of FIG. 2.

108 of FIG. 10. The circuit 108 constructs each of the truncated waveforms by adding individual pulses at intervals during each period of a waveform section. The circuit comprises a clock 110 whose output is delivered to a shift register 114. The shift register has seven output lines 116 for generating pulses at various times between each clock pulse. Each output line 116 of the shift register is connected to a resistor 118 which has many taps 120. One resistor tap 120 from each resistor is connected to an adding circuit 122 whose output is a Hermite waveform. Thus, in the circuit 108 of FIG. 10, one tap from each of the seven resistors 118 is delivered to a first adding circuit to construct the $H_0'$ waveform.

Although only seven output lines are shown connected to the shift register 118, practical systems generally employ at least 15 output lines in order to construct each Hermite waveform with reasonable accuracy. The circuit 108 in FIG. 10 can be used as the generator 26 of FIG. 1 in the construction of a transmitter.

The detection of the information signals may be accomplished by multiplying the received and modulated signal by each of the Hermite waveform signal trains as shown in FIG. 2. Another method is by the use of matched filters, illustrated by the receiver circuit of FIG. 9.

Figure 9:
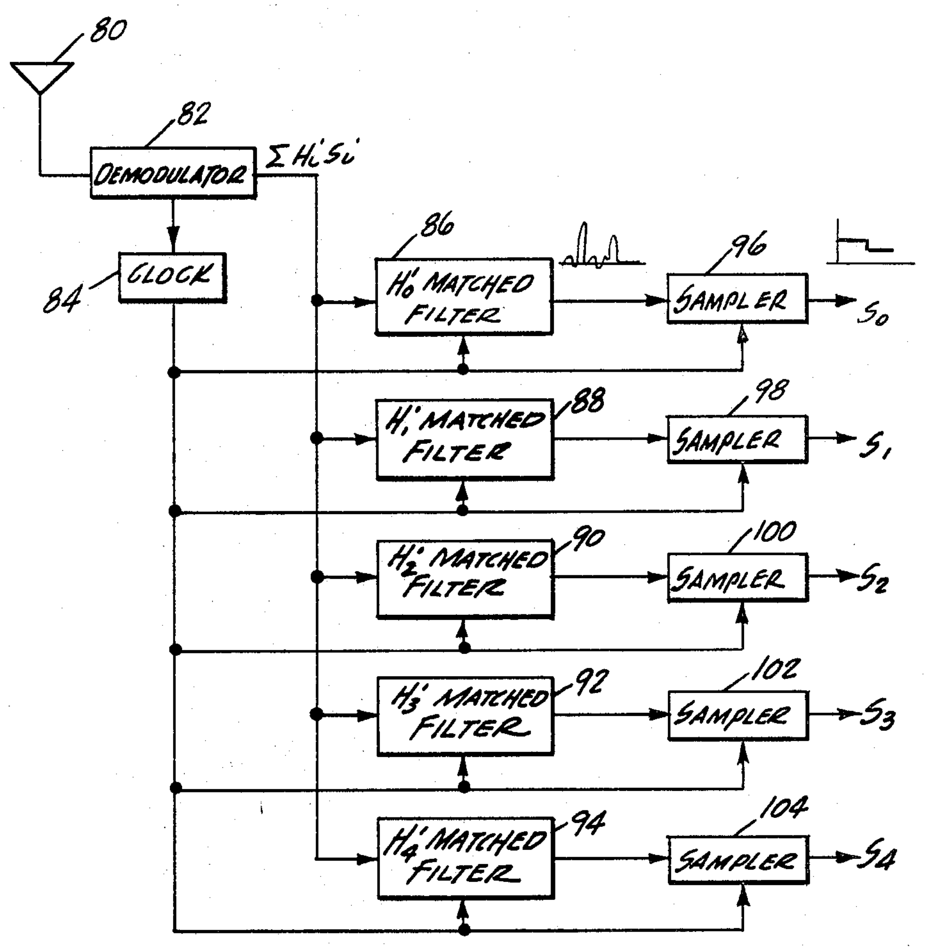
FIG. 9 is a block diagram of a receiver using matched filters for receiving signals transmitted by the tarnsmitter of FIG. 1.

The receiver circuit of FIG. 9 is adapted to receive signals transmitted by the transmitter circuit of FIG. 1. An antenna 80 of the receiver receives signals which are demodulated in demodulator 82 to produce the sum signal $\Sigma H_iS_i$ and to produce a signal which synchronizes the receiver clock 84. The sum signal is delivered to each of five matched filters 86, 88, 90, 92 and 94 which are matched to the Hermite waveform sections $H_0'$, $H_1'$, $H_2'$, $H_3'$, and $H_4'$, respectively described hereinbefore. The impulse response of the filter 86, which is matched to the waveform $H_0'$, is essentially a delayed replica of the waveform $H_0'$. The response of the matched filter 86 to an $H_0'$ waveform section input is an output having a maximum amplitude occurring at a predetermined time, which is proportional to the amplitude of the waveform section $H_0'$ (the amplitude is proportional to $S_0$). The output of the matched filter 86 is sampled at the time wherein the peak value generally occurs, by a sampler 96. The sample is held by the sampler 96 until a new sample is taken so that the output of the sampler 96 is proportional to the original signal samples so taken from the first information channel of the transmitter of FIG. 1. The other matched filters, which are matched to each of the other four Hermite waveform sections, and the output of the sampler circuits 98, 100, 102, and 104 associated with them are the signal samples $S_1$, $S_2$, $S_3$ and $S_4$, respectively. The construction of a matched filter for any given waveform section is well known in the art and therefore will not be described in detail.

While particular embodiments of the invention have been described, obviously many modifications and variations therein may be made. Accordingly, the invention is not limited to the particular embodiments shown, but only by a just interpretation of the following claims.

We claim:

1. An improved multiplex communication system comprising:

a transmitter including:

transmitter generating means for repeatedly generating a plurality of mutually orthogonal Hermite waveform signals which are orthogonal to the Gaussian function, said waveform signals being substantially defined over predetermined limited time periods by the equation $$H_n(t)=\frac{(-1)^n a^{(n-1/2)}}{\pi^{1/4}\sqrt{n!}2^{n/2}} e^{t^2/2n^2}\frac{d^n}{dt^n}\left[e^{-t^2/a^2}\right]$$

where $t$ is an independent variable representing time, $n$ is an integer which is different for each of said waveform signals, $H_n(t)$ is the amplitude of the waveform signal and $a$ is substantially a constant, a plurality of signal sampling means, each of said signal sampling means sampling during said predetermined limited time periods a corresponding one of a plurality of channels of information signals, and said predetermined limited time periods are of at least a duration established by the relationship $3.2<T/a<3.8+.2K$, where T is one-half the time period of each of said waveform signals and K is the number of channels of information signals, a plurality of transmitter multiplying means for multiplying each of said mutually orthogonal Hermite waveform signals by a corresponding one of said plurality of information signals, summing means for summing the outputs of said transmitter multiplying means to provide a composite waveform suitable of transmission with least crosstalk for any given transmission time and bandwidth limitations, and means for transmitting a signal containing said summed signal; and a receiver including:

means for receiving said transmitted signal and obtaining said summed signal therefrom, receiver generating means for repeatedly generating a plurality of mutually orthogonal Hermite waveform signals substantially identical to the Hermite waveform signals generated by said transmitter generating means, a plurality of receiver multiplying means for multiplying said waveform signals generated by said receiver generating means respectively with said summed signal obtained from said transmitted signal, a plurality of integrating means for repeatedly integrating respective outputs of said receiver multiplying means to provide output signals proportional to corresponding ones of said information signals, and synchronizing means responsive to repetitious components in portions, established by said predetermined limited time periods, of said summed signal obtained from said transmitted signal for synchronizing the repetitive operation of said receiver generating means and said integrating means with said predetermined limited time periods.

2. The invention as defined in claim 1 wherein K is at least 6, and said predetermined limited time periods are of at least a duration wherein the signal energy contained in each of said waveform signals is at least about 97% and less than 99.999% of the signal energy in a corresponding signal which is defined by said equation and extends over an infinite time from $t=-\infty$ to $t=+\infty$.

3. In an improved multiplex communication system, a transmitter comprising:

transmitter generating means for repeatedly generating a plurality of mutually orthogonal Hermite waveform signals which are orthogonal to the Gaussian function, said waveform signals being substantially defined over predetermined limited time periods by the equation $$H_n(t)=\frac{(-1)^n a^{(n-1/2)}}{\pi^{1/4}\sqrt{n!}2^{n/2}} e^{t^2/2n^2}\frac{d^n}{dt^n}\left[e^{-t^2/a^2}\right]$$

where $t$ is an independent variable representing time, $n$ is an integer which is different for each of said waveform signals, $H_n(t)$ is the amplitude of the waveform signal and $a$ is substantially a constant;

a plurality of signal sampling means, each of said signal sampling means sampling during said predetermined limited time periods a corresponding one of a plurality of channels of information signals, and said predetermined limited time periods are of at least a duration established by the relationship $3.2<T/a<3.8+.2K$, where T is one-half the time period of each of said waveform signals and K is the number of channels of information signals;

a plurality of transmitter multiplying means for multiplying each of said mutually orthogonal Hermite waveform signals by a corresponding one of said plurality of information signals;

summing means for summing the outputs of said transmitter multiplying means to provide a composite waveform suitable of transmission with least crosstalk for any given transmission time and bandwidth limitations; and means for transmitting a signal containing said summed signal.

4. The invention as defined in claim 3 wherein said transmitter generating means includes a pulse generator, a shift register driven by said pulse generator and having a plurality of outputs, a plurality of resistive networks connected to respective outputs of said shift register and each having a plurality of output taps, and a plurality of adding networks each having an output tap from each of said resistive networks connected thereto, said adding networks providing respective ones of said waveform signals therefrom, and wherein K is at least 6, and said predetermined limited time periods are of at least a duration wherein the signal energy contained in each of said waveform signals is at least about 97% and less than 99.999% of the signal energy in a corresponding signal which is defined by said equation and extends over an infinite time from $t=-\infty$ to $t=+\infty$.

5. In an improved multiplex communication system, a receiver comprising:

means for receiving a transmitted signal including a summed signal and obtaining said summed signal therefrom, said summed signal being the sum of a plurality of mutually orthogonal, repeatedly generated Hermite waveform signals which are orthogonal to the Gaussian function and respectively multiplied by a plurality of information signals provided from separate channels, said waveform signals being substantially defined over predetermined limited time periods by the equation $$H_n(t)=\frac{(-1)^n a^{(n-1/2)}}{\pi^{1/4}\sqrt{n!}2^{n/2}} e^{t^2/2n^2}\frac{d^n}{dt^n}\left[e^{-t^2/a^2}\right]$$

where $t$ is an independent variable representing time, $n$ is an integer which is different for each of said waveform signals of the transmitted signal, $H_n(t)$ is the amplitude of the waveform signal and $a$ is substantially a constant, and said predetermined limited time periods are of at least a duration established by the relationship $3.2<T/a<3.8+.2K$, where T is one-half the time period of each of said waveform signals and K is the number of channels of information signals;

receiver generating means for repeatedly generating a plurality of mutually orthogonal Hermite waveform signals substantially identical to the Hermite waveform signals included in said summed signal of said transmitted signal;

a plurality of receiver multiplying means for multiplying said waveform signals generated by said receiver generating means respectively with said summed signal obtained from said transmitted signal;

a plurality of integrating means for repeatedly integrating respective outputs of said receiver multiplying means to provide output signals proportional to corresponding ones of said information signals; and synchronizing means responsive to repetitious components in portions, established by said predetermined limited time periods, of said summed signal obtained from said transmitted signal for synchronizing the repetitive operation of said receiver generating means and said integrating means with said predetermined limited time periods.

6. The invention as defined in claim 5 wherein said receiver generating means includes a plurality of matched filters connected to said receiving means, each of said matched filters being matched to a respective one of said waveform signals generated by said receiver generating means, and wherein K is at least 6, and said predetermined limited time periods are of at least a duration wherein the signal energy contained in each of said waveform signals is at least about 97% and less than 99.999% of the signal energy in a corresponding signal which is defined by said equation and extends over an infinite time from $t=-\infty$ to $t=+\infty$.

7. In a multiplex communication system, a transmitter comprising:

first generator means for repeatedly generating signals $H_0(t)$ substantially defined, over predetermined limited time periods, by the equation $$H_0(t)=\frac{1}{\pi^{1/4}a^{1/2}}e^{-t^2/2a^2}$$

where $a$ is a constant and $t$ is a variable;

second generator means for repeatedly generating signals $H_1(t)$ substantially defined, over said predetermined limited time periods, by the equation $$H_1(t)=\frac{2^{1/2}t}{\pi^{1/4}a^{3/2}}e^{-t^2/2a^2}$$

third generator means for repeatedly generating signals $H_2(t)$ substantially defined, over said predetermined limited time periods, by the equation $$H_2(t)=\frac{1}{\pi^{1/4}2^{1/2}a^{5/2}}(2t^2-a^2)e^{-t^2/2a}$$

fourth generator means for repeatedly generating signals $H_3(t)$ substantially defined, over said predetermined limited time periods, by the equation $$H_3(t)=\frac{2^{1/2}}{\pi^{1/4}6^{1/2}a^{7/2}}(2t^3-3a^2t)e^{-t^2/2a^2}$$

fifth generator means for repeatedly generating signals $H_4(t)$ substantially defined, over said predetermined limited time periods, by the equation $$H_4(t)=\frac{1}{2\pi^{1/4}6^{1/2}a^{9/2}}(4t^4-12a^2t^2+3a^4)e^{-t^2/2a^2}$$

said predetermined limited time periods each being of at least a duration established by the relationship $3.2<T/a<3.8+.2K$, where T is one-half the time period of each of said waveform signals and K is the number of channels of information signals;

at least five signal sampling means, each of said signal sampling means sampling during said predetermined limited time periods a corresponding one of at least five different channels of information signals;

at least five multiplying means, each of said multiplying means connected to a corresponding one of said generator means and to a corresponding one of said signal sampling means, for generating the product of the signal outputs thereof; and summing means connected to said at least five multiplying means for summing the outputs thereof to provide a composite waveform suitable for transmission with least crosstalk for any given transmission time and bandwidth limitations.

References Cited

UNITED STATES PATENTS

| | | | |
|---|---|---|---|
| 3,204,035 | 8/1965 | Ballard et al. | 179—150 |
| 3,204,034 | 8/1965 | Ballard et al. | 179—150 |
| 2,878,317 | 3/1959 | Evans | 179—150 |
| 2,719,189 | 9/1955 | Bennett et al. | 179—150 |

ROBERT L. GRIFFIN, *Primary Examiner.*

UNITED STATES PATENT OFFICE

CERTIFICATE OF CORRECTION

Patent No. 3,384,715 May 21, 1968

Peter K. Higuchi et al.

It is certified that error appears in the above identified patent and that said Letters Patent are hereby corrected as shown below:

Column 1, line 15, "polynominal" should read -- polynomial --; line 26, "having" should read -- have --; line 37, "since 2 wt" should read -- sine 2 wt --. Column 2, line 5, after "limited" insert a comma; line 17, after "band" insert a hyphen; line 41, "of" should read -- on --. Column 4, lines 18 and 19, the equation should appear as shown below:

$$H_n(t) = \frac{(-1)^n a^{(n-1/2)}}{\pi^{1/4}\sqrt{n!}\ 2^{n/2}} e^{t^2/2a^2} \frac{d^n}{dt^n}\left[e^{-t^2/a^2}\right]$$

Column 6, line 70, column 7, line 65, and column 8, line 46, "$e^{t^2/2n^2}$", each occurrence, should read -- $e^{t^2/2a^2}$ --. Column 7, line 43, "predetermined" should be aligned with the beginning of the preceding line 42.

Signed and sealed this 25th day of November 1969.

(SEAL)
Attest:

EDWARD M.FLETCHER,JR.
Attesting Officer

WILLIAM E. SCHUYLER,JR.
Commissioner of Patents